No. 644,865. Patented Mar. 6, 1900.
B. G. LAMME.
SYSTEM OF ELECTRICAL DISTRIBUTION.
(Application filed June 14, 1899.)
(No Model.)
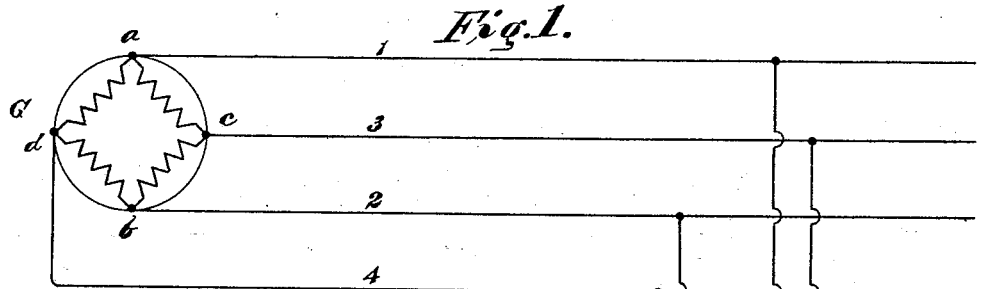
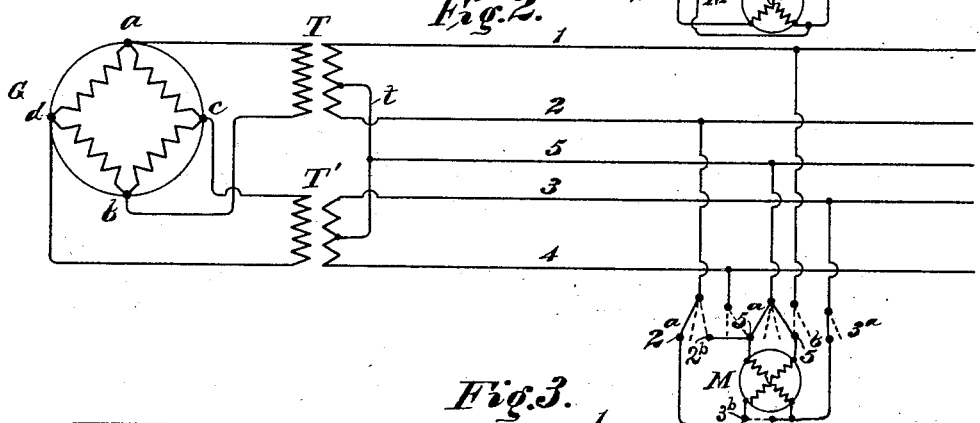
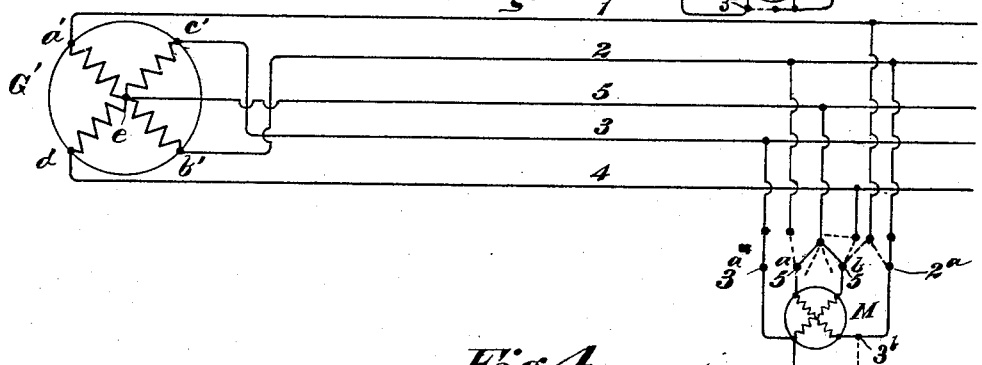
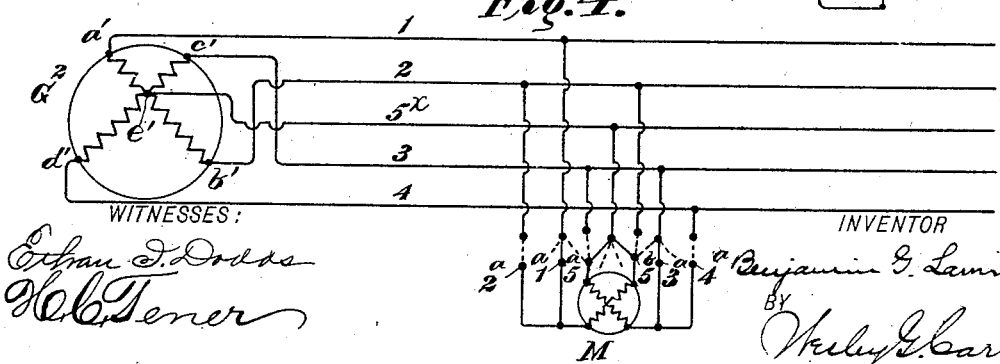
WITNESSES: INVENTOR
Ethan J. Dodds Benjamin G. Lamme
H. C. Tener BY Wiley J. Carr
ATTORNEY.

United States Patent Office.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 644,865, dated March 6, 1900.

Application filed June 14, 1899. Serial No. 720,525. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Systems of Electrical Distribution, (Case No. 839,) of which the following is a specification.

My invention relates to systems of alternating-current electrical distribution and to apparatus employed in connection therewith.

The object of my invention is to provide a method and a means whereby a two-phase alternating-current induction-motor may be started from a state of rest and brought to full speed and operated under a light load economically and without the employment of complicated and wasteful governing and controlling apparatus.

Various means have been proposed for starting induction-motors under load, such as the employment of a variable resistance in the secondary circuit or circuits, the employment of either an auto or two-coil transformer in the primary circuit and varying the active length of its winding, &c.

For the purpose above indicated I propose to obtain two-phase voltages in quadrature from the generator which shall be lower than the normal voltages of the system and reduce the starting torque and current of the motor by varying the connections between the motor-windings and the generator leads, whether such leads be from the primary source of energy or from two-coil or auto transformers, such transformers being hereinafter referred to as "secondary generators."

If an induction-motor is worked at a small part of its rated load, it usually takes a large amount of current from the line in proportion to the work performed, and if a motor of this class is to work for a considerable length of time under such conditions a better apparent efficiency or ratio of true power developed to apparent power expended can be obtained by varying the electromotive force applied to the primary member of the motor. The exciting-watts or volt-amperes in the motor vary practically as the square of the voltage, while the true watts remain practically constant as the voltage is varied unless the condition of overload for same voltage is reached. Consequently, for a light load on the motor the reduction of the voltage reduces the exciting-watts in the ratio above stated, while the working watts remain almost constant. In order to vary the voltage for operating under such conditions or for starting under light loads, I propose to employ the means illustrated in the accompanying drawings, in which—

Figure 1 is a diagram of a two-phase motor, distributing-mains, and means for adjusting the mutual relation of the motor and generator leads. Fig. 2 is a diagram similar to Fig. 1, except that the motor is supplied from the secondaries of two transformers, the primaries of which are supplied by the main generator. Fig. 3 is a diagram similar to Fig. 1, but embodying a generator having an open-coil or two-circuit winding. Fig. 4 is a diagram similar to Fig. 3, but embodying a generator having differently-arranged windings.

Referring now particularly to Fig. 1, the two-phase generator G is of the closed-coil or single-circuit type, having two leads $a$ and $b$, corresponding to one phase at full voltage, and opposite leads $c$ and $d$, corresponding to a phase in quadrature with that of the leads $a$ and $b$ at full voltage. Distributing conductors or mains 1 and 2 are connected, respectively, to the leads $a$ and $b$, and the distributing conductors or mains 3 and 4 to the leads $c$ and $d$. A two-phase induction-motor M is shown as arranged to be operated by the energy received from the mains 1 2 and 3 4, and in order that it may be started and, if necessary, operated at light load under favorable conditions I propose to supply current to the primary windings of the motor from any three adjacent leads of the generator G. As here illustrated, the leads employed are those designated as $a$, $b$, and $c$. The difference of potential between the leads $a$ and $c$ and that between leads $b$ and $c$ is approximately seven-tenths of that between the leads $a$ and $b$, the resulting torque and input of the motor being approximately one-half the normal. It will be understood without further illustration or description that any three adjacent leads of the generator may be connected to the motor-windings in the manner in which the leads $a$, $b$, and $c$ are connected and that two electromotive forces in quadrature, each of which is approximately seven-tenths of the maximum electromotive force of the generator, may be thus provided.

In order to secure the seven-tenths voltage, half-torque, and input above referred to, I connect, by means of suitable switching devices, the conductor 1 with the contact-terminal $1^a$, the conductor 3 with the contact-terminals $3^a$ and $3^b$, and the conductor 2 with the contact-terminal $2^a$, thus throwing the voltage of the circuit 1 3 upon one winding of the motor M and the voltage of the circuit 3 2 upon the other motor-winding.

In order to secure a maximum torque of the motor and corresponding maximum voltage and current, I disconnect the conductor 2 from terminal $2^a$ and connect it to the contact-terminal $2^b$ by means of a suitable switching device, as indicated, leaving the conductor 1 connected as was the case for the lower voltage. I also leave the connection of the conductor 3 with the contact-terminal $3^a$ as before and open the connection between this conductor and the contact-terminal $3^b$ and connect conductor 4 with the contact-terminal $2^a$, this arrangement being such as to throw the entire voltage of the generator for each phase on the corresponding winding of the primary member of the motor M.

Referring now to Fig. 2, the generator G is of the same type as that illustrated in Fig. 1, the leads corresponding to one phase at full voltage being, however, connected to the primary of a transformer T and the full-voltage leads for the other phase being connected to the primary of a transformer T'. The middle points of the secondary windings of the two transformers T and T' are connected together by means of a suitable conductor $t$, and an additional main or distributing conductor 5 has one end connected thereto. Instead of having the construction shown the transformers T and T' may be of the single-coil or auto type and may be located either outside or inside the generator. If located inside the generator, these two windings may obviously be directly connected together at their middle points. With the arrangement here shown I may supply the motor M with two electromotive forces in quadrature and of substantially one-half the full electromotive force of the generator G by connecting conductor 2 to the contact-terminal $2^a$ by a suitable switching device, as indicated, the conductor 5 to the two contact-terminals $5^a$ and $5^b$, and the conductor 3 to the contact-terminal $3^a$, the condition of quadrature being maintained. It will be understood that either half of the secondary windings of the transformers T and T' may be utilized in this relation and that the arrangement of switches may be correspondingly varied without varying the invention.

In order to supply the motor M with substantially seven-tenths of the full voltage of the generator G, I transfer the connection of conductor 2 from terminal $2^a$ to terminal $2^b$, connect conductor 3 to terminal $3^b$, disconnect conductor 5 from terminals $5^a$ and $5^b$, and connect conductor 1 to terminal $5^b$.

In order to apply the full generator-voltage to the motor M, I change the connection of conductor 2 from terminal $2^b$ to terminal $2^a$, disconnect conductor 3 from terminal $3^b$, and connect conductor 4 with the contact-terminal $5^a$, the other connections remaining the same as for the next lower voltage.

Referring now to Fig. 3, the generator G' has an armature-winding of the open-coil or two-circuit type, the exterior opposite leads $a'$ $b'$ and $c'$ $d'$ of which are connected, respectively, to distributing mains or conductors 1 2 and 3 4 to give maximum electromotive forces of substantially ninety degrees phase difference. If these two windings are joined together at an intermediate point, as $e$, and a distributing-conductor 5 joined thereto, three different voltages may also be secured for application to the motor-armature. If any two of the adjacent single leads and the intermediate joint lead be properly connected to the windings of the primary member of the motor, substantially one-half the normal voltage will be secured, and, as shown in the drawings, the leads $b'$, $c'$, and $e$ are thus employed for securing the lowest quarter-phase electromotive forces, it being understood that any two adjacent single leads may be employed in connection with the intermediate joint lead. As shown, the conductor 3 is connected to the contact-terminal $3^a$ by a switching device, the conductor 2 to the contact-terminal $2^a$, and the conductor 5 to the terminals $5^a$ and $5^b$, thus providing the arrangement necessary for the desired voltages, as above set forth.

In order to obtain substantially seven-tenths of the normal voltage and the other conditions specified in connection with Figs. 1 and 2 of the drawings, I disconnect the conductor 5 from both contact-terminals $5^a$ and $5^b$ and connect the conductor 1 to contact-terminal $5^b$, conductor 3 to contact-terminals $3^a$ and $3^b$, and disconnect conductor 2 from terminal $2^a$.

For full voltage on the motor M, I connect conductor 1 to contact-terminal $2^a$, connect conductor 2 to contact-terminal $5^a$, disconnect conductor 3 from contact-terminal $3^b$, and connect conductor 4 to terminal $5^b$.

In Fig. 4 I have shown a system in which the generator $G^2$ is of the type of the generator G' shown in Fig. 3, but in which the windings are connected together unsymmetrically, so that the voltage between each of leads $a'$ and $c'$ and the joint $e'$ is different from that between each of leads $a'$ and $b'$ and joint $e$. With this arrangement two equal quarter-phase voltages may be supplied to the motor through conductors 1 and $5^\times$ and $5^\times$ and 3, respectively, and a second and different pair of voltages in quadrature by the conductors 2 and 5× and 5× and 4, respectively, full voltages, as in preceding examples, being supplied by conductors 1 and 2 and 3 and 4. The adjustment of the switching devices in connection with the contact-terminals 1ª, 2ª, 3ª, 4ª, 5ª, and 5ᵇ in order to provide the primary of the motor M with any one of the three voltages from the machine is as follows: Conductors 1 and 3 are connected, respectively, to terminals 1ª and 3ª, and conductor 5× to terminals 5ª and 5ᵇ for the lowest voltage, conductors 2 and 4 to terminals 2ª and 4ª, and conductors 5× to terminals 5ª and 5ᵇ for the next higher voltage, and conductors 1, 2, 3, and 4, respectively, to terminals 1ª, 5ᵇ, 5ª, and 4ª for maximum voltages, all connections not specified being open in each case.

It will be understood that any number of motors within the limits of the power supplied by the generator may be employed and that the construction and arrangement of generators and motors and switching device is not limited to what is shown in the drawings any further than has been specified in the description already given.

I claim as my invention—

1. In a system of electrical distribution, a two-phase motor, a two-phase primary or secondary generator and means for connecting the motor-windings to intermediate leads and to extreme leads from the generator for different quarter-phase electromotive forces.

2. In a system of electrical distribution, a two-phase motor, a two-phase generator, and means for connecting adjacent leads from the generator to the motor-windings for a relatively-low electromotive force and small starting torque and current and for connecting opposite leads to the motor-windings for a maximum electromotive force, torque and current.

3. In a system of electrical distribution, a two-phase motor, a two-phase generator having an open-coil or two-circuit armature-winding, and means for connecting the motor-windings to adjacent single leads and to a joint lead from an intermediate connection of the two circuits for a relatively-small starting torque and current, for connecting adjacent single leads only for a greater torque and current, and for connecting opposite leads for a maximum torque and current.

4. In a system of electrical distribution, a two-phase motor, a two-phase generator having an open-coil or two-circuit armature-winding unsymmetrically connected, and means for connecting adjacent single leads and a joint lead, adjacent single leads only, or opposite leads, according to the electromotive force and resulting torque desired.

5. The method of starting two-phase electric motors which consists in supplying the motor from adjacent generator-leads for a relatively-low starting torque and current and from opposite leads for a maximum torque and current.

6. The method of starting two-phase electric motors which consists in supplying the motor from adjacent single leads and a joint intermediate lead of a two-circuit generator-armature for a relatively-small starting torque and current, then from adjacent single leads only for a greater torque and current, and finally from opposite leads for a maximum torque and current.

7. The method of starting a two-phase electric motor or operating the same economically under light load from a two-phase generator which consists in supplying the motor with currents from adjacent leads of the generator.

8. The method of starting a two-phase electric motor or operating the same economically under light load from a two-circuit, two-phase generator, which consists in supplying the motor with currents from adjacent single leads and a joint intermediate lead of the generator.

In testimony whereof I have hereunto subscribed my name this 13th day of June, 1899.

BENJ. G. LAMME.

Witnesses:
WESLEY G. CARR,
H. C. TENER.